(12) United States Patent
Pearce

(10) Patent No.: US 9,438,013 B2
(45) Date of Patent: *Sep. 6, 2016

(54) DRIVE ASSEMBLY FOR AN ELECTRICAL SWITCHING APPARATUS RACKING ASSEMBLY

(71) Applicant: Eaton Corporation, Cleveland, OH (US)

(72) Inventor: Michael Davis Pearce, Plum Branch, SC (US)

(73) Assignee: EATON CORPORATION, Cleveland, OH (US)

( * ) Notice: Subject to any disclaimer, the term of this patent is extended or adjusted under 35 U.S.C. 154(b) by 189 days.

This patent is subject to a terminal disclaimer.

(21) Appl. No.: 14/197,300

(22) Filed: Mar. 5, 2014

(65) Prior Publication Data

US 2015/0255964 A1 Sep. 10, 2015

(51) Int. Cl.
*H02B 11/127* (2006.01)
*H02B 1/36* (2006.01)

(52) U.S. Cl.
CPC ............... *H02B 1/36* (2013.01); *H02B 11/127* (2013.01)

(58) Field of Classification Search
CPC .................. H02B 1/36; H02B 11/12–11/127; H02B 11/167; H02B 11/173
USPC ................... 361/606–609; 200/50.21–50.27; 211/1.57
See application file for complete search history.

(56) References Cited

U.S. PATENT DOCUMENTS

| 7,910,845 B2 | 3/2011 | Kozar et al. | |
|---|---|---|---|
| 8,654,513 B2* | 2/2014 | Bower | H02B 11/127 200/50.24 |
| 2010/0097732 A1* | 4/2010 | Dean | H02H 7/0816 361/31 |
| 2012/0055766 A1* | 3/2012 | Greer | H02B 11/02 200/50.24 |
| 2015/0114807 A1* | 4/2015 | Benke | H02B 11/127 200/50.23 |
| 2015/0255964 A1* | 9/2015 | Pearce | H02B 11/127 211/1.57 |

FOREIGN PATENT DOCUMENTS

| CN | 202 142 798 U | 2/2012 |
|---|---|---|
| DE | 198 03 476 C1 | 10/1999 |
| WO | 2013/139275 A1 | 9/2013 |
| WO | 2013/143415 A1 | 10/2013 |

OTHER PUBLICATIONS

European Patent Office, "Patrial International Search Report for PCT/US2015/012338", Mar. 24, 2015, 6 pages.

* cited by examiner

*Primary Examiner* — Zachary M Pape
(74) *Attorney, Agent, or Firm* — Eckert Seamans Cherin & Mellott, LLC; David C. Jenkins; Philip E. Levy

(57) ABSTRACT

A drive assembly for an electrical switching apparatus racking assembly is provided. The drive assembly includes a positioning assembly, a motor assembly, and a control assembly. The positioning assembly is structured to impart movement to said carriage assembly and to move said carriage assembly from said first position to said second position. The motor assembly is structured to impart movement to said positioning assembly. The control assembly is structured to control said motor assembly. The control assembly is in electronic communication with the motor assembly. The motor assembly is operatively coupled to the positioning assembly.

15 Claims, 10 Drawing Sheets

DRIVE ASSEMBLY FOR AN ELECTRICAL SWITCHING APPARATUS RACKING ASSEMBLY

BACKGROUND OF THE INVENTION

1. Field of the Invention

The present invention relates to an electrical switching apparatus and, more specifically, to a motorized drive assembly for an electrical switching apparatus racking assembly.

2. Background Information

An electrical switching apparatus, in an exemplary embodiment, includes a housing assembly a number of electrical components and at least one bus assembly. The housing assembly is structured to insulate and enclose the other components. The number of electrical components include, but are not limited to, circuit breakers, voltage transformers, control power transformers, fuses, batteries, and other electrical components. The bus assembly includes a conductive bus that is further coupled to, and in electrical communication with, an external line bus or a load bus. Within the housing assembly is a contact assembly which is fixed to the housing assembly. At least one electrical component includes a movable contact assembly. The electrical components are disposed on a movable carriage. The carriage moves between a first and second position. When the carriage is in the first position, the electrical component movable contact assembly is spaced from, and not in electrical communication with, the housing assembly contact assembly. When the carriage is in the second position, the electrical component movable contact assembly is coupled to, and in electrical communication with, the housing assembly contact assembly. These components are withdrawn to isolate them from the voltage source thus creating a safe work environment for the user to perform maintenance or inspections. Movement of the carriage is done manually.

Manual movement of the carriage has several disadvantages. For example, the electrical switching apparatus may be heavy requiring a technician to exert considerable force to move the carriage. Further, a technician must be at the location of the electrical switching apparatus. In addition, the technician may accidentally force the carriage into the second position when components are misaligned. There is, therefore a need for a drive assembly for an electrical switching apparatus that overcomes these disadvantages.

SUMMARY OF THE INVENTION

These needs, and others, are met by at least one embodiment of the disclosed concept which provides a drive assembly including a positioning assembly, a motor assembly, and a control assembly. The positioning assembly is structured to impart movement to said carriage assembly and to move said carriage assembly from said first position to said second position. The motor assembly is structured to impart movement to said positioning assembly. The control assembly is structured to control said motor assembly. The control assembly is in electronic communication with the motor assembly. The motor assembly is operatively coupled to the positioning assembly.

BRIEF DESCRIPTION OF THE DRAWINGS

A full understanding of the disclosed and claimed concept can be gained from the following description of the preferred embodiments when read in conjunction with the accompanying drawings in which:

FIG. 8A is a detail view of the manual drive assembly.

DESCRIPTION OF THE PREFERRED EMBODIMENTS

Figure 1:
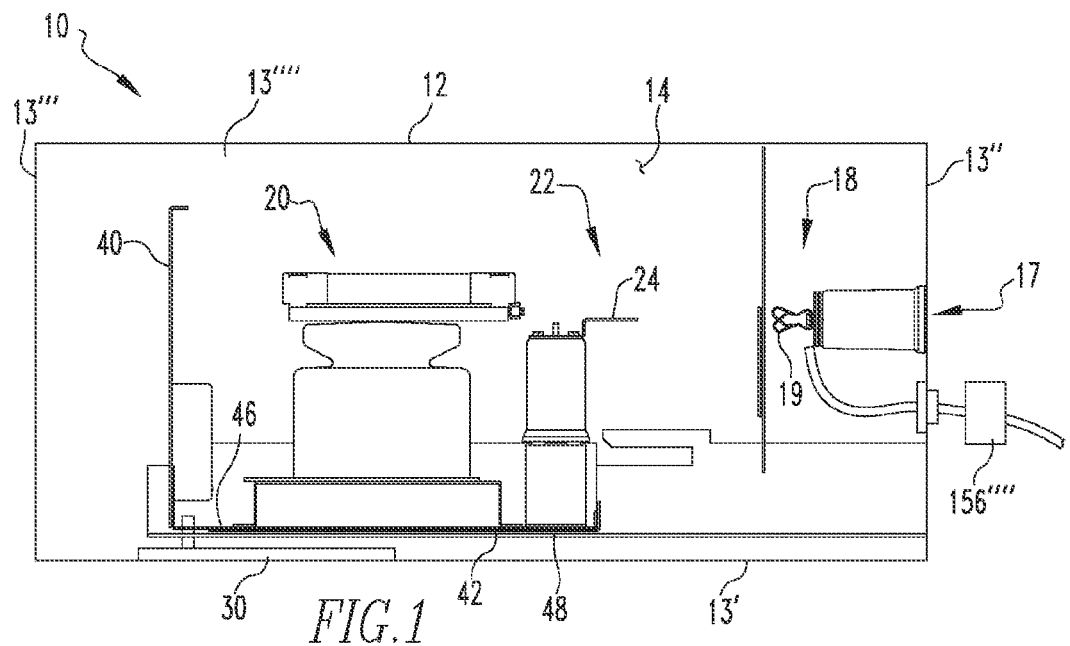
FIG. 1 is a schematic side view of an electrical switching apparatus with a carriage assembly in a first position.

As used herein, the singular form of "a," "an," and "the" include plural references unless the context clearly dictates otherwise.

As used herein, the term "number" means one or an integer greater than one (i.e., a plurality).

As used herein, a "limited number" means one or more of a larger set. For example, a "number" wheels on a vehicle includes four wheels; a "limited number" of wheels means at least one but less than four.

As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other. Accordingly, when two elements are coupled, all portions of those elements are coupled. A description, however, of a specific portion of a first element being coupled to a second element, e.g., an axle first end being coupled to a first wheel, means that the specific portion of the first element is disposed closer to the second element than the other portions thereof. Further, an object resting on another object held in place only by gravity is not "coupled" to the lower object unless the upper object is otherwise maintained substantially in place. That is, for example, a book on a table is not coupled thereto, but a book glued to a table is coupled thereto.

As used herein, a "coupling assembly" includes two or more couplings or coupling components. The components of a coupling or coupling assembly are generally not part of the same element or other component. As such, the components of a "coupling assembly" may not be described at the same time in the following description. Further, a "removable coupling assembly" is a coupling assembly wherein the components are easily separated, such as, but not limited to a nut and bolt.

As used herein, a "coupling" is one element of a coupling assembly. That is, a coupling assembly includes at least two components, or coupling components, that are structured to be coupled together. It is understood that the elements of a coupling assembly are compatible with each other. For example, in a coupling assembly, if one coupling element is a snap socket, the other coupling element is a snap plug.

As used herein, the statement that two or more parts or components "engage" one another shall mean that the parts exert a force against one another either directly or through one or more intermediate parts or components.

As used herein, the word "unitary" means a component is created as a single piece or unit. That is, a component that includes pieces that are created separately and then coupled together as a unit is not a "unitary" component or body.

As used herein, "correspond" indicates that two structural components are sized and shaped to be similar to each other and may be coupled with a minimum amount of friction. Thus, an opening which "corresponds" to a member is sized slightly larger than the member so that the member may pass through the opening with a minimum amount of friction. This definition is modified if the two components are said to fit "snugly" together or "snuggly correspond." In that situation, the difference between the size of the components is even smaller whereby the amount of friction increases. If the element defining the opening and/or the component inserted into the opening are made from a deformable or compressible material, the opening may even be slightly smaller than the component being inserted into the opening. This definition is further modified if the two components are said to "substantially correspond." "Substantially correspond" means that the size of the opening is very close to the size of the element inserted therein. That is, not so close as to cause substantial friction, as with a snug fit, but with more contact and friction than a "corresponding fit," i.e. a "slightly larger" fit.

As used herein, "associated" means that the elements are part of the same assembly and/or operate together, or, act upon/with each other in some manner. For example, an automobile has four tires and four hub caps. While all the elements are coupled as part of the automobile, it is understood that each hubcap is "associated" with a specific tire.

Directional phrases used herein, such as, for example and without limitation, top, bottom, left, right, upper, lower, front, back and derivatives thereof, relate to the orientation of the elements shown in the drawings and are not limiting upon the claims unless expressly recited therein.

As used herein, "structured to [verb]" means that the identified element or assembly has a structure that is shaped, sized, disposed, coupled and/or configured to perform the identified verb. For example, a member that is "structured to move" is movably coupled to another element and includes elements that cause the member to move or the member is otherwise configured to move in response to other elements or assemblies.

As used herein, "structured to [verb]" when used in relation to a software module or code, means that the module/code includes executable computer instructions, code, data, or similar elements that perform the identified task.

As used herein, and when used in reference to communicating data or a signal, "in electronic communication" includes both hardline and wireless forms of communication.

As used herein, "in electric communication" means that a current passes between the identified elements.

As shown in FIGS. 1-7, an electrical switching apparatus 10 includes a housing assembly 12, a number of electrical components 20, and a number of racking assemblies 30. The housing assembly 12 includes a number of sidewalls 13 that define an enclosed space 14. In an exemplary embodiment, the sidewalls 13 include a generally planar bottom sidewall 13', a generally planar back sidewall 13", a movable front cover 13''', and two lateral sidewalls 13''''. The housing assembly 12 further includes a number of rails 16. As shown, the rails are disposed in generally parallel pairs of rails 16. In an exemplary embodiment, the rails 16 are planar members extending generally perpendicular and upwardly from the bottom sidewall 13'. Further, the rails 16 extend generally in a front-to-back direction in the housing assembly 12. In an alternate embodiment, there are a number of rails 16 in each housing assembly 12. The rails 16 are disposed in generally parallel pairs with the lowest pair extending generally perpendicular and upwardly from the bottom sidewall 13. The upper pairs of rails 16 are coupled to the lateral sidewalls 13'''' of the housing assembly 12. In this configuration, multiple sets of electrical components 20 and racking assemblies 30 may be disposed in the housing assembly 12.

The housing assembly 12 also includes a bus assembly 17. The bus assembly 17 includes, among other components, a contact assembly 18. The housing assembly contact assembly 18 is structured to be coupled to another contact assembly. In an exemplary embodiment, the housing assembly contact assembly 18 includes two resilient fingers 19 that are biased toward each other. The housing assembly contact assembly 18 is in electrical communication with a line or load bus. The housing assembly contact assembly 18 is coupled, or fixed, to the back sidewall 13".

The number of electrical components 20 vary depending upon the nature of the electrical switching apparatus 10. In an exemplary embodiment, and as used herein, the number of electrical components 20 include circuit breakers, voltage transformers, control power transformers, fuses, batteries and other electrical components The number of electrical components 20, or a limited number of the number of electrical components 20, are in electrical communication with each other. At least one of the number of electrical components 20 includes a movable contact assembly 22. The movable contact assembly 22 is structured to be coupled to, and placed in electrical communication with, the housing assembly contact assembly 18. In an exemplary embodiment, the movable contact assembly 22 includes a planar member 24 that is structured to fit between the fingers 19 of the housing assembly contact assembly 18. The movable contact assembly 22 is in electrical communication with at least one of the number of electrical components 20.

Figure 2:
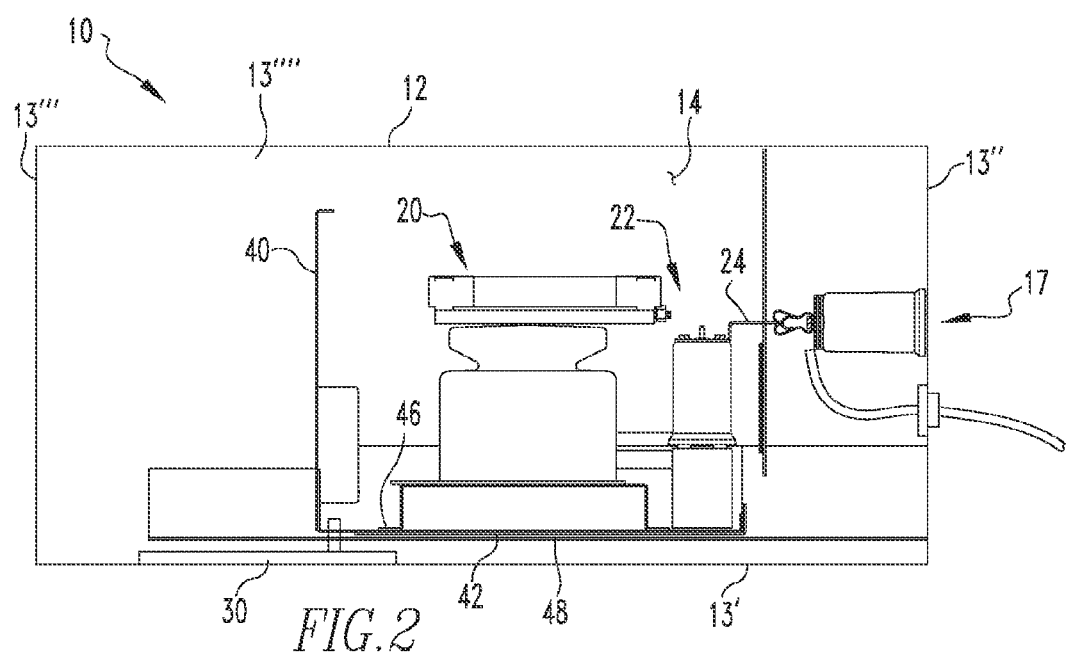
FIG. 2 is a schematic side view of an electrical switching apparatus with a carriage assembly in a second position.
Figure 3:
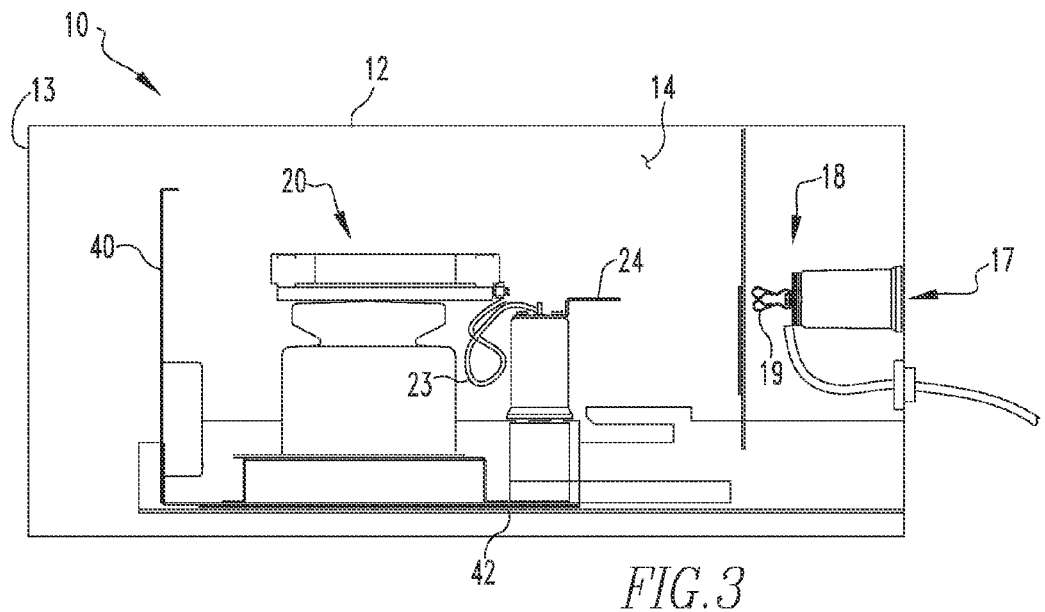
FIG. 3 is a schematic side view of an alternate electrical switching apparatus with a carriage assembly in a first position.
Figure 4:
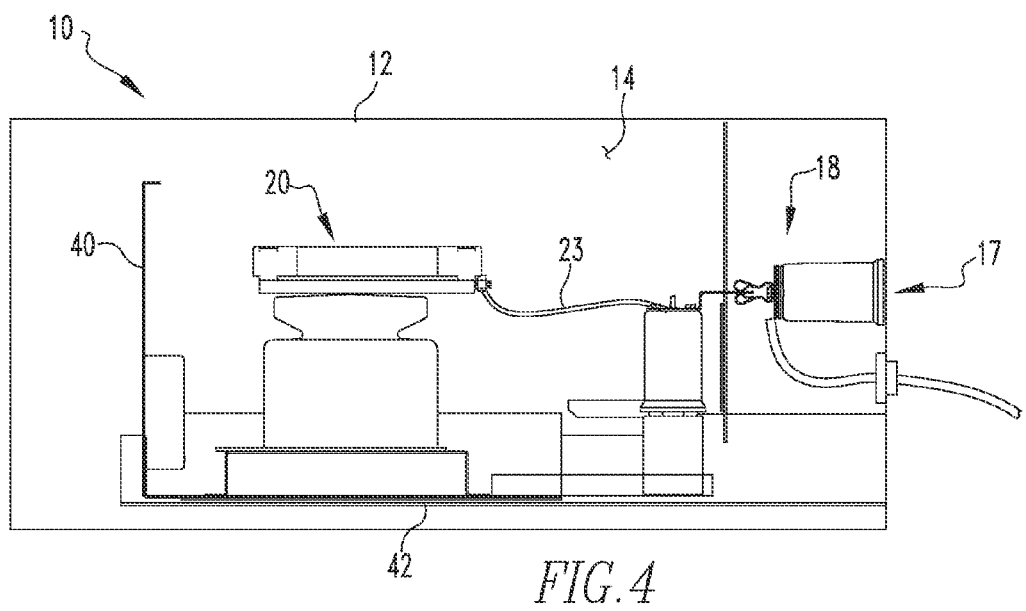
FIG. 4 is a schematic side view of an alternate electrical switching apparatus with a carriage assembly in a second position.

The racking assemblies 30 are substantially similar and therefore, only one will be described. The racking assembly 30 includes a movable carriage assembly 40 and a drive assembly 50, shown in FIG. 8. The carriage assembly 40 includes a body 42 and a number of wheels 44. The carriage assembly body 42 is sized to fit within said housing assembly enclosed space 14. In an exemplary embodiment, the carriage assembly body 42 is generally rectangular, generally planar and disposed generally horizontally. That is, the carriage assembly body 42, in an exemplary embodiment, includes a generally planar upper surface 46 and a generally planar lower surface 48. The carriage assembly body 42 is structured to support the number of electrical components 20, or a limited number of the number of electrical components 20. That is, as shown in FIGS. 1 and 2, the carriage assembly body 42, in one embodiment, supports all the electrical components 20 and the electrical components 20 move therewith. Alternatively, as shown in FIGS. 3 and 4, the carriage assembly body 42 supports a limited number of electrical components 20 including the movable contact assembly 22. In this embodiment, the movable contact assembly 22 is coupled to, and in electrical communication with, the unsupported electrical components 20 via a conductor 23.

Figure 5:
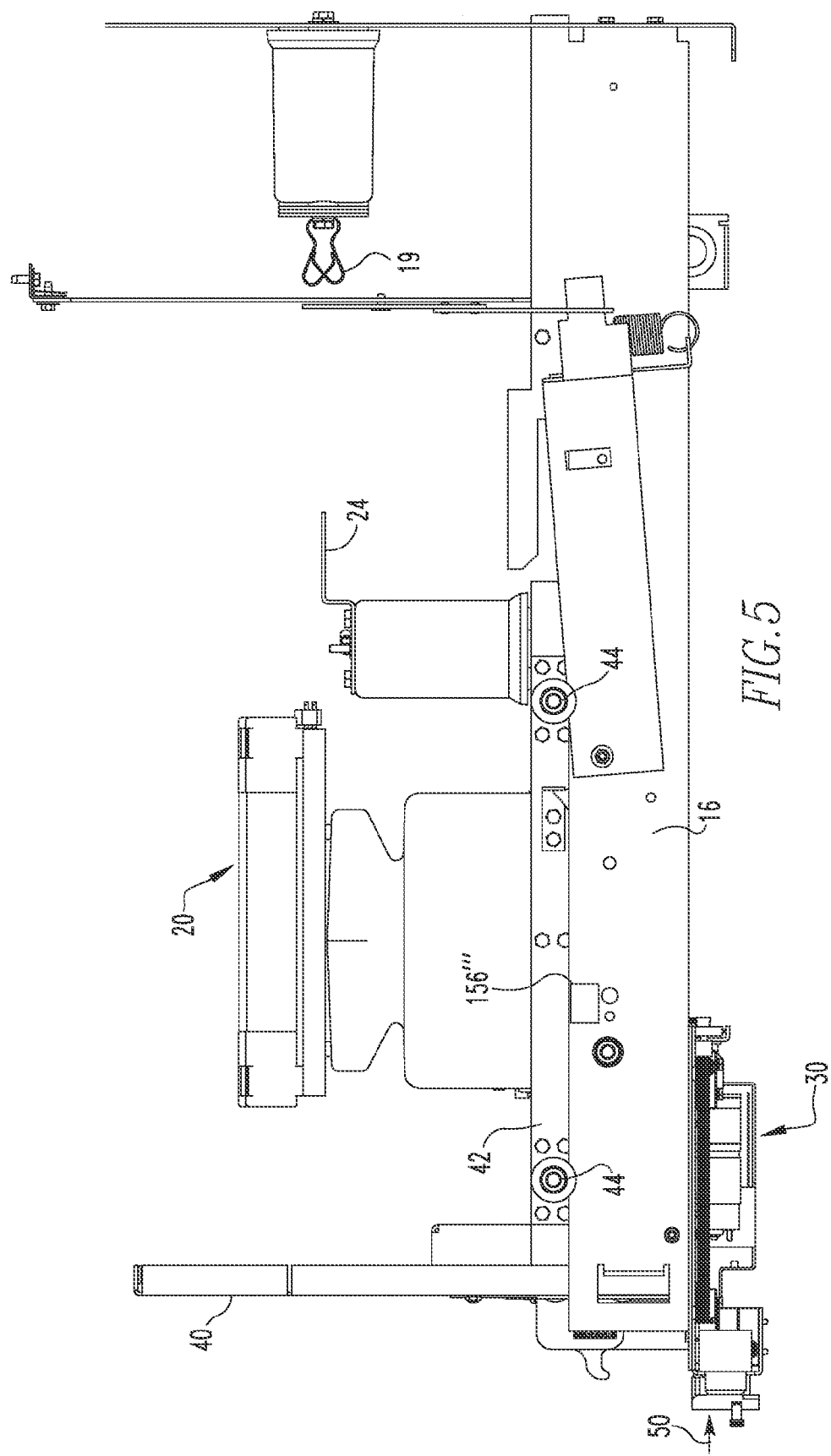
FIG. 5 is a partial side view of an electrical switching apparatus with a carriage assembly in a first position.
Figure 6:
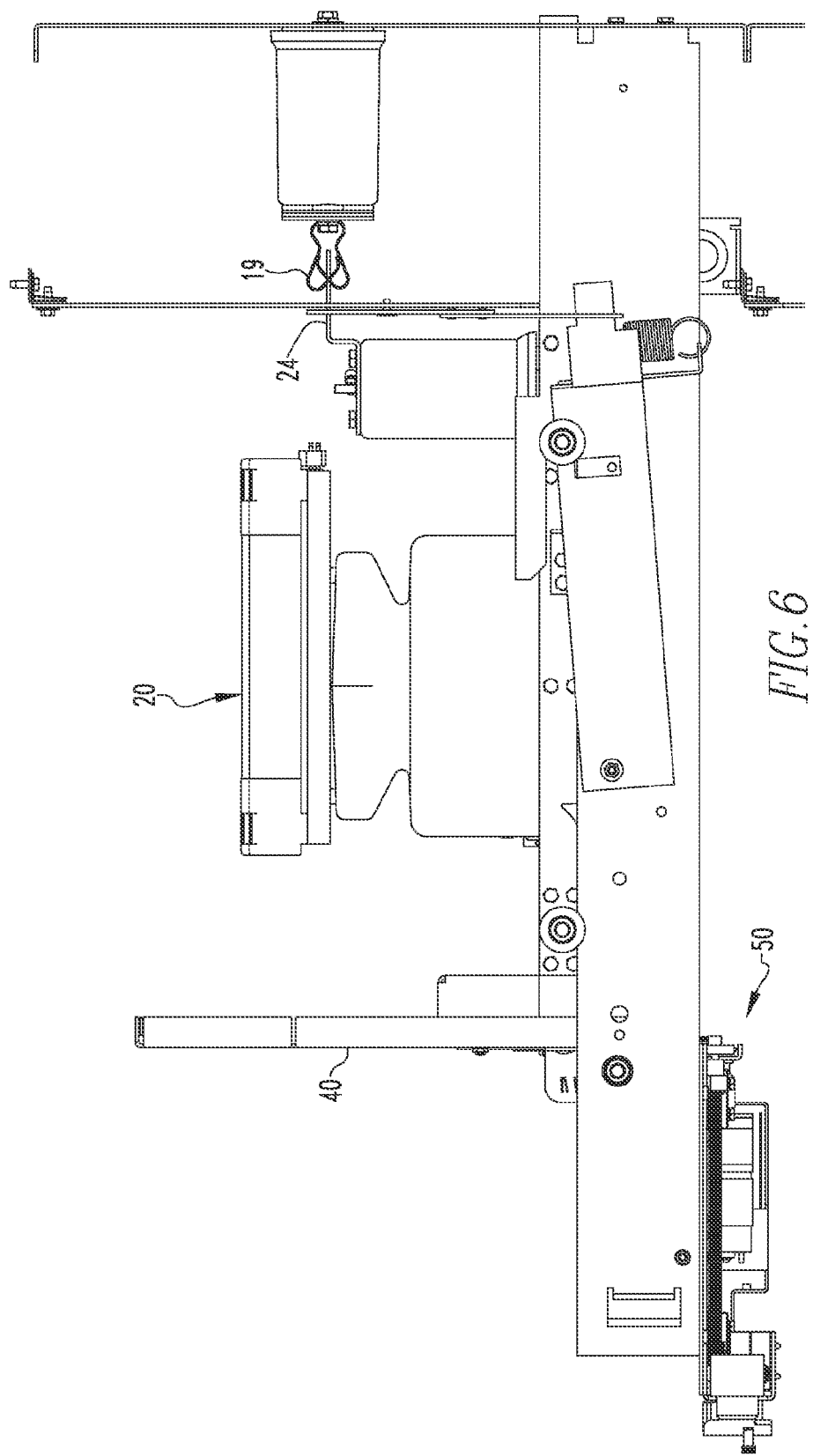
FIG. 6 is a partial side view of an electrical switching apparatus with a carriage assembly in a second position.

Further, the carriage assembly body 42 is structured to be moved between a first position and a second position, as shown in FIGS. 5 and 6. In an exemplary embodiment, the carriage assembly wheels 44 are rotatably coupled to the carriage assembly body 42. In an exemplary embodiment, there are four carriage assembly wheels 44 which are disposed in opposing pairs on the lateral sides of the carriage assembly body 42. The carriage assembly wheels 44 are structured to travel over the housing assembly rails 16. As used herein, the carriage assembly body 42 defines a "path of travel" between the carriage assembly body 42 first position and second position. That is, as used herein, the carriage assembly body 42 "path of travel" is defined by space occupied by the movable carriage assembly 40 and the number of electrical components 20 disposed thereon as the carriage assembly body 42 moves between the first position and second position.

Figure 7:
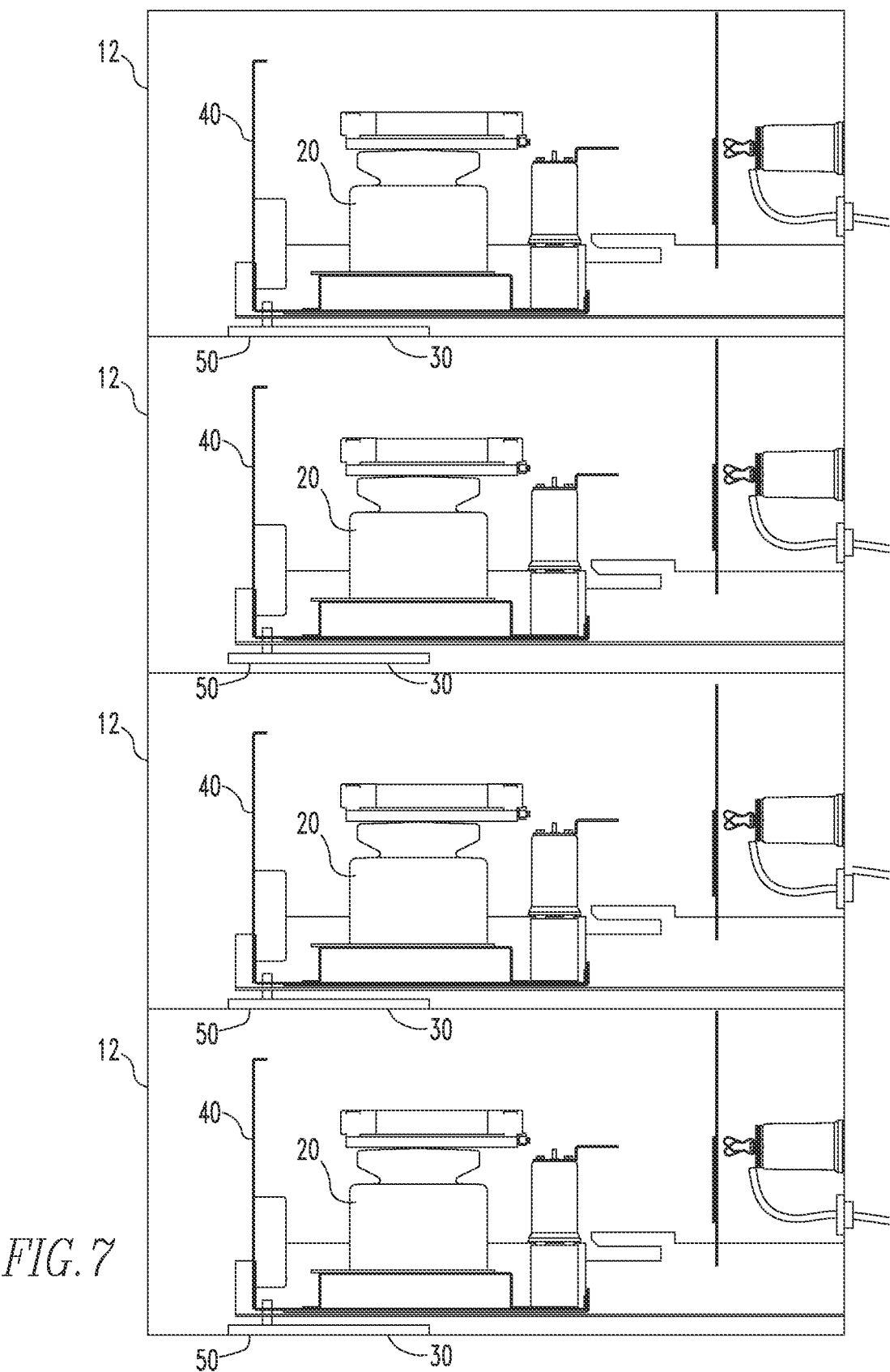
FIG. 7 is a side cross-sectional view showing a number of stacked carriage assemblies.
Figure 10:
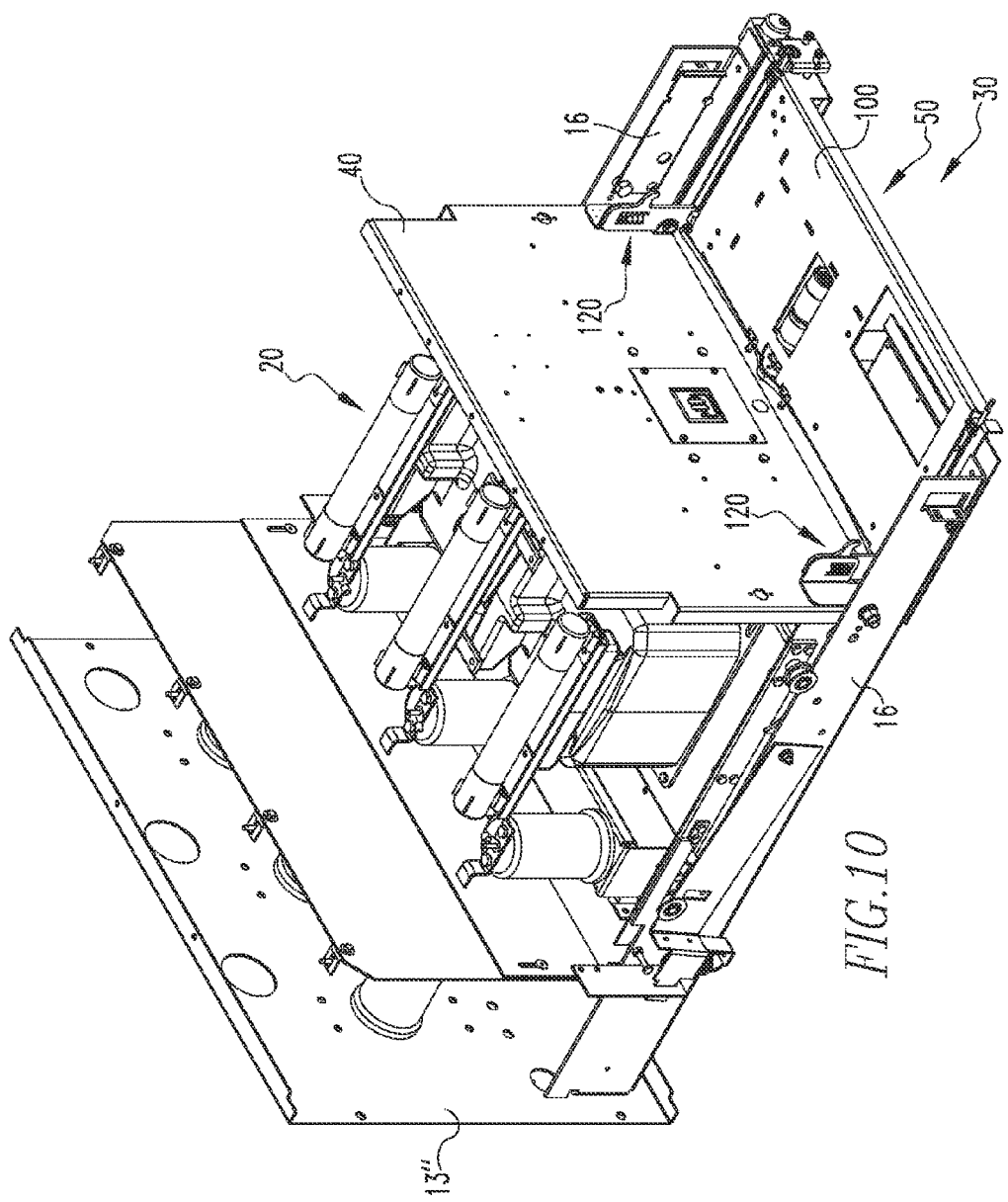
FIG. 10 is a partial isometric view of a racking assembly.

As shown in FIG. 7, the housing assembly 12 is, in an exemplary embodiment, structured to enclose a number of racking assemblies each with a movable carriage assembly 40 supporting electrical components 20. The movable carriage assemblies 40 are disposed in a stacked configuration, i.e., one carriage assembly 40 disposed above another. As discussed in detail below, the drive assembly 50 has a thin profile that allows the drive assembly 50 to be disposed below the associated carriage assembly 40 in the space defined by the rails 16 (FIG. 10). That is, each drive assembly 50 is coupled to, directly coupled to, or fixed to the housing assembly 12 at a location below and between the rails 16 used by the associated carriage assembly 40.

Figure 8:
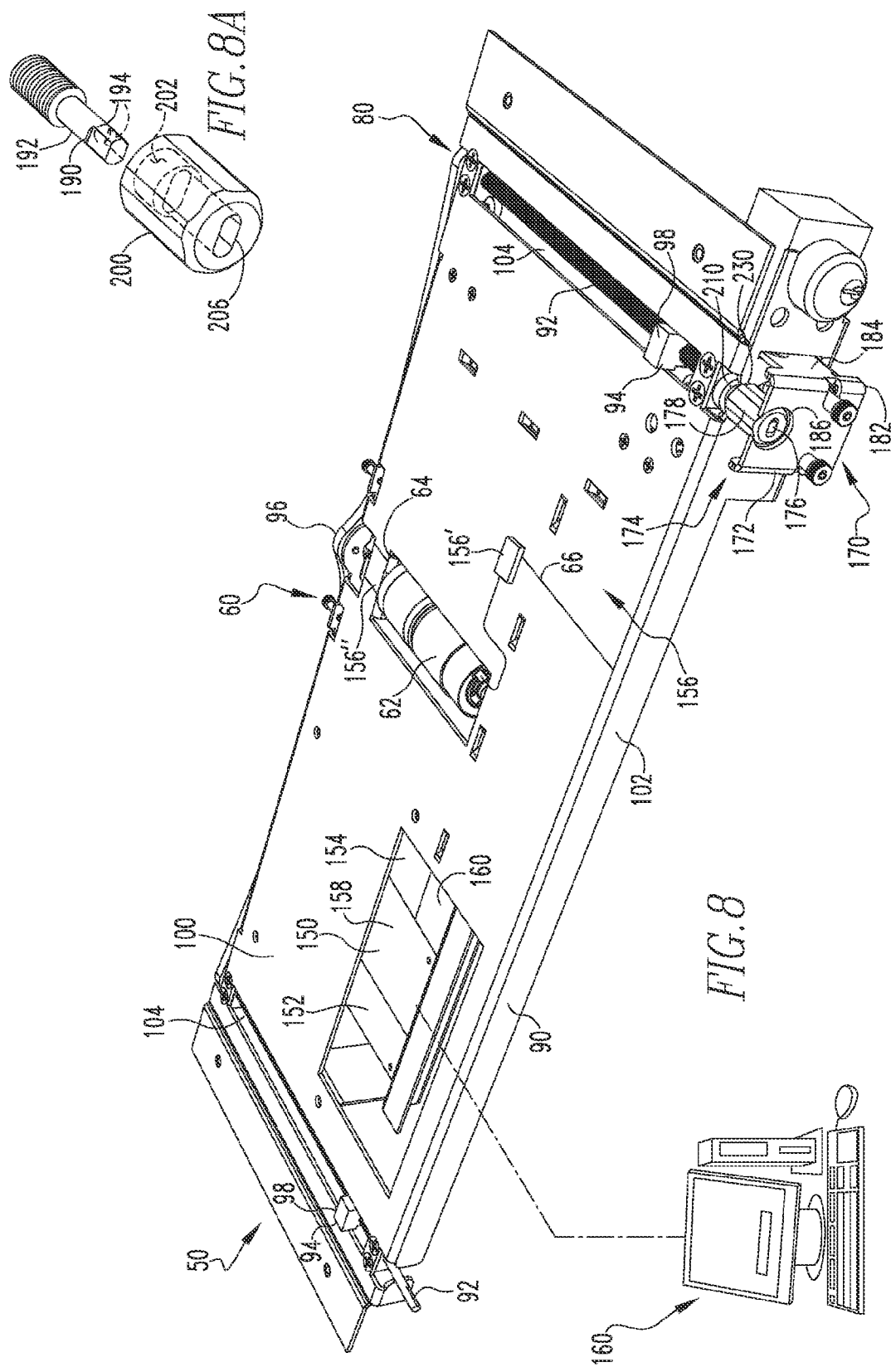
FIG. 8 is an isometric view of a drive assembly.
Figure 9:
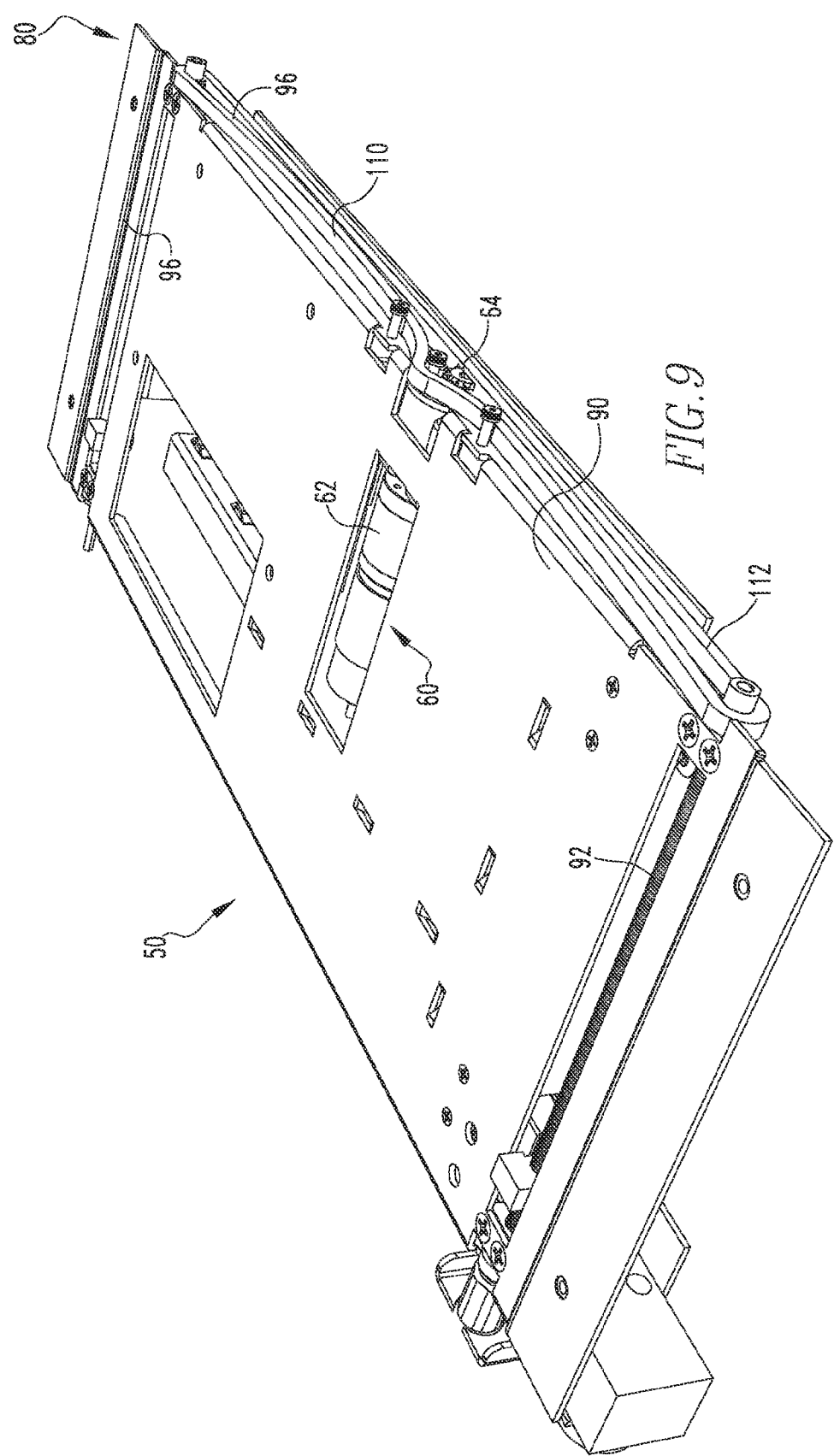
FIG. 9 is another isometric view of a drive assembly.

The drive assembly 50, shown in FIGS. 8 and 9, includes a motor assembly 60 and a positioning assembly 80. In an exemplary embodiment, the drive assembly 50 further includes a manual override assembly 120, a control assembly 150, and a lock assembly 230. The motor assembly 60 is structured to impart movement to the positioning assembly 80. In one exemplary embodiment, the motor assembly 60 is coupled, directly coupled, or fixed to the carriage assembly body 42. In an alternate embodiment, the motor assembly 60 is coupled, directly coupled, or fixed to the housing assembly 12. The motor assembly 60, in an exemplary embodiment, is an electric motor 62 that includes a rotating output shaft 64 and a power line 66. The motor assembly 60 is coupled to the positioning assembly 80. In an exemplary embodiment, the motor assembly 60 is structured to cause the output shaft 64 to rotate in two directions, i.e. clockwise and counter clock-wise. In an exemplary embodiment, the output shaft 64 is operatively coupled to the positioning assembly 80. As used herein, "operatively coupled" means that motion in one element is transferred to another element; the motion, however, may be altered, e.g. a rotational motion may be transformed into a linear motion.

The positioning assembly 80 is structured to impart movement to the carriage assembly 40 and to move the carriage assembly 40 from the first position to the second position. That is, the positioning assembly 80 is structured to position the carriage assembly 40 at a selected location in the housing assembly 12. The positioning assembly 80 is coupled, directly coupled, removably coupled, or fixed to the carriage assembly body 42 and/or the housing assembly 12. In an exemplary embodiment, the positioning assembly 80 is disposed between the carriage assembly body 42 and the housing assembly 12 thereby coupling the two elements. The positioning assembly 80 is structured to cooperate with the motor assembly 60. That is, the positioning assembly 80 is structured to convert motion generated by the motor assembly 60 into a motion that imparts movement to the carriage assembly 40.

For example, in one embodiment, not shown, the positioning assembly 80 includes a worm gear, a toothed rack, and low friction sliders (none shown). The rack is fixed to the carriage assembly 40. The motor assembly 60 is fixed to the housing assembly 12. The worm gear is fixed to the output shaft 64 and is operatively coupled to the rack. The low friction sliders are coupled to the bottom side of the carriage assembly body 42. In this configuration, when the motor assembly 60 is actuated, the worm gear rotates and engages the rack. The rack, and therefore the carriage assembly body 42 moves in response to the motion of the worm gear. In another embodiment, also not shown, the carriage assembly wheels 44 are operatively coupled to the drive assembly 50, e.g. by a drive shaft (not shown).

In an exemplary embodiment, as shown, a positioning assembly 80 includes a support assembly 90, a number of lead screws 92, a number of drive blocks 94, and a transmission assembly 96. The support assembly 90 includes a generally planar member 100 and a number of generally vertical sidewalls 102. The support assembly 90 generally defines the height of the drive assembly 50. That is, as used herein, "generally defines the height of the drive assembly" means the height of the closely coupled elements and expressly does not include the height/position of the sensors 156 or the manual override assembly 120. The support assembly 90 has a height of between about 1.5 inches and 3.5 inches, or about 2.5 inches.

The support assembly planar member 100 defines a number of drive channels 104. In an exemplary embodiment, the support assembly planar member 100 is generally rectangular and is sized to be disposed in the housing assembly 12. The vertical sidewalls 102 are coupled, directly coupled or fixed to the support assembly planar member 100 and extend generally perpendicular to and downwardly therefrom. The support assembly vertical sidewalls 102 are further coupled, directly coupled or fixed to the housing assembly bottom sidewall 13'.

In an exemplary embodiment, the drive channels 104 are elongated slots in the support assembly planar member 100. Further, when the support assembly planar member 100 is disposed in the housing assembly 12, the drive channels 104 extend generally in a front-to-back direction in the housing assembly 12. Each lead screw 92 is disposed in an associated drive channel 104. In an exemplary embodiment, there are two lead screws 92 and two drive channels 104. The two drive channels 104 are disposed near the lateral sides of the support assembly planar member 100. Each lead screw 92 is rotatably coupled to the support assembly planar member 100.

Each drive block 94 is sized to loosely correspond to the width of an associated drive channel 104. In an exemplary embodiment, each drive block 94 is a generally parallelepiped body 98 that defines a threaded passage (not shown). Each threaded passage is sized to correspond to the associated lead screw 92. Each drive block 94 is movably coupled to the associated lead screw 92. That is, each lead screw 92 is threaded through an associated drive block 94. In this configuration, each drive block 94 cannot rotate substantially within the associated drive channel 104, but can move freely along the associated lead screw 92. Thus, rotation of each lead screw 92 causes the associated drive block 94 to move along the lead screw 92 between a first position and second position.

The transmission assembly 96 is operatively coupled to the motor assembly 60 as well as to each lead screw 92. In an exemplary embodiment, the transmission assembly 96 includes a tension member 110 such as, but not limited to, one of a belt 112, toothed belt (not shown), or a chain (not shown). The tension member 110 is operatively coupled to the motor assembly output shaft 64. In an exemplary embodiment, the motor assembly output shaft 64 has an axis of rotation that is generally parallel to, and generally in the same plane as, the axis of rotation of the two lead screws 92. The tension member 110 is also operatively coupled to both lead screws 92. Thus, rotational motion is transferred from the motor assembly 60 to the lead screws 92 via the tension member 110. As noted above, rotational motion of the lead screws 92 cause the drive blocks 94 to move along the lead screws 92. It is understood that the rotation of the lead screws 92 causes the drive blocks 94 to move in one direction and an opposite rotation of the lead screws 92 causes the drive blocks 94 to move in the other direction.

The drive assembly 50 is assembled as follows. The motor assembly 60 is coupled, directly coupled, or fixed to the support assembly 90 with the axis of rotation of the motor assembly output shaft 64 having an axis of rotation that is generally parallel to, and generally in the same plane as, the axis of rotation of the two lead screws 92. The tension member 110 is operatively coupled to both the motor assembly output shaft 64 and the lead screws 92. The support assembly 90 is then coupled, directly coupled, or fixed to the housing assembly 12. In an exemplary embodiment, the support assembly 90 is disposed between, but below, or partially below, a pair of rails 16. That is, because the drive assembly 50 has a low profile, the drive assembly 50 occupies a minimal space in the housing assembly 12 and is disposed outside the carriage assembly body 42 path of travel. The support assembly 90 is, in an exemplary embodiment, disposed so that the lead screw 92 extends generally front-to-back within the housing assembly 12.

In this configuration, the carriage assembly 40 is structured to be coupled to the positioning assembly 80. In an exemplary embodiment, the carriage assembly body 42 is coupled, directly coupled, fixed, or selectively coupled to the drive blocks 94. In this configuration, the carriage assembly body 42 moves with the drive blocks 94 between a first position and second position. The number of electrical components 20 disposed on the carriage assembly body 42 move therewith. This includes the movable contact assembly 22 which moves between a separated, first position, wherein the housing assembly contact assembly 18 and the movable contact assembly 22 are not in electrical communication, and a coupled, second position, wherein the housing assembly contact assembly 18 and the movable contact assembly 22 are in electrical communication. In an exemplary embodiment, the housing assembly contact assembly 18 is disposed on the back sidewall 13"; thus, the movable contact assembly 22 separated, first position is when the carriage assembly 40 is disposed closer to the forward side of the housing assembly 12, and, the movable contact assembly 22 coupled, second position is when the carriage assembly 40 is disposed closer to the back sidewall 13".

Figure 11:
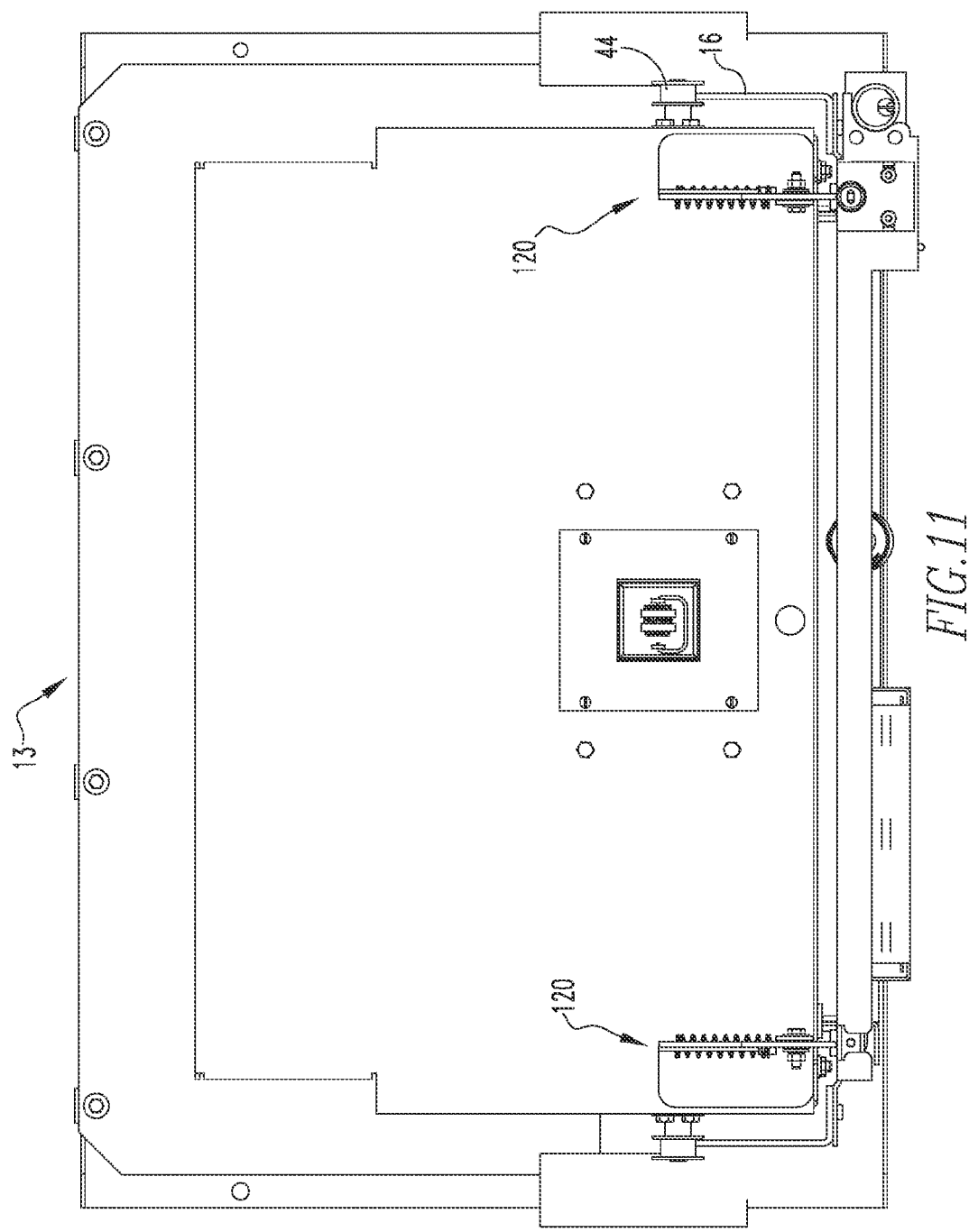
FIG. 11 is a partial rear view of a racking assembly.

In an exemplary embodiment, the carriage assembly body 42 is selectively coupled to the drive blocks 94. That is, the manual override assembly 120, shown in FIGS. 10-12 allows for the carriage assembly body 42 and the drive blocks 94 to be selectively decoupled. In this configuration, a user decouples the carriage assembly 40 and the drive assembly 50 so as to manually move the carriage assembly body 42 between the carriage assembly body 42 first and second positions with the use of the drive assembly 50. Thus, in an exemplary embodiment, the manual override assembly 120 includes a selectively couplable coupling assembly 122.

In an exemplary embodiment, the selectively couplable coupling assembly 122 includes a number of first coupling components 124 and a number of second coupling components 126. Each selectively couplable coupling assembly first coupling component 124, hereinafter "manual override first coupling component 124," is coupled to a lead screw 92. In the embodiment shown, each manual override first coupling component 124 is a drive block 94. Each selectively couplable coupling assembly second coupling component 126, hereinafter "manual override second coupling component 126," is coupled to the carriage assembly 40. In an exemplary embodiment, each manual override second coupling component 126 is a bracket latch assembly 130.

Figure 12:
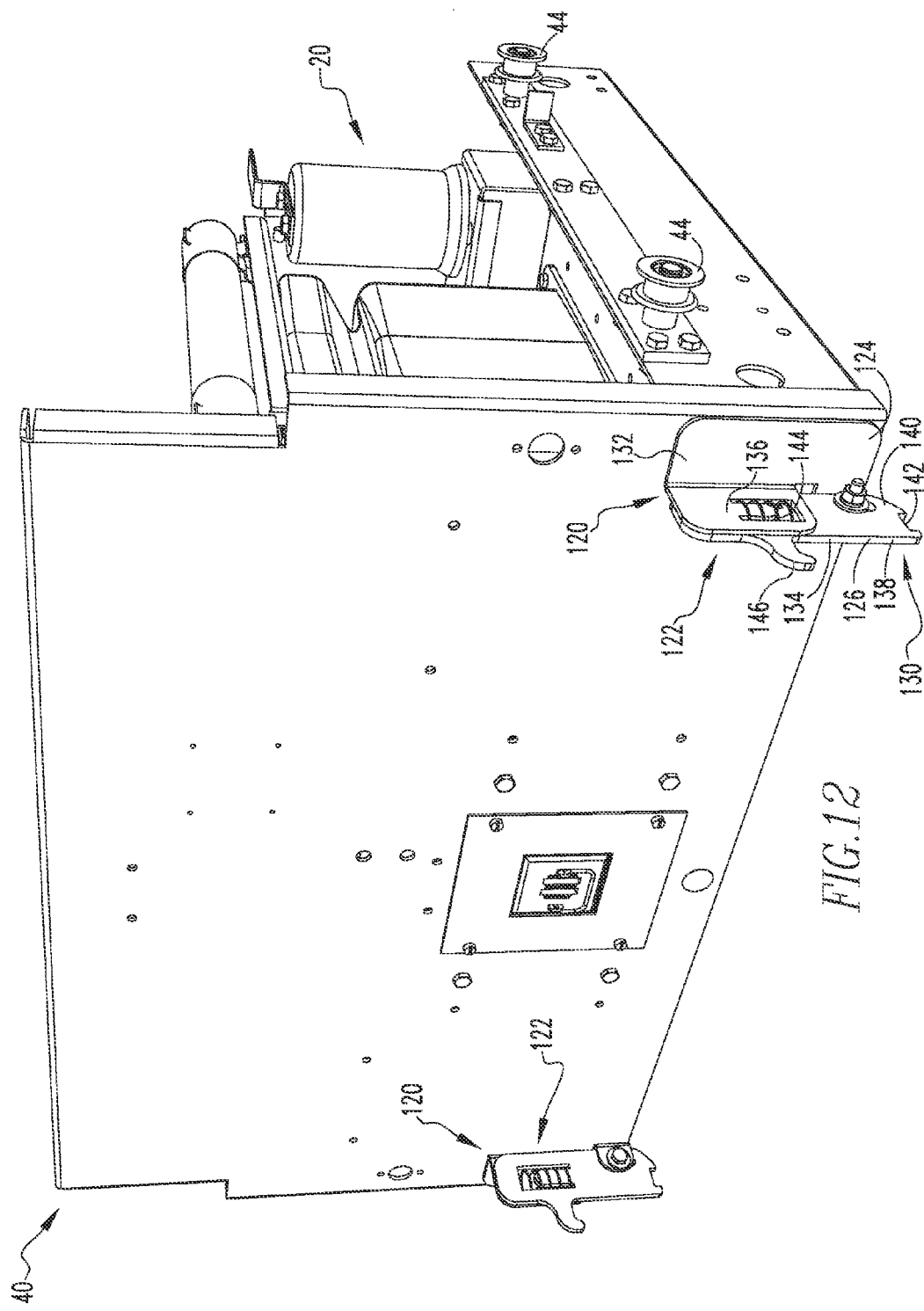
FIG. 12 is a detail view of a manual override assembly.

As shown in FIG. 12, a bracket latch assembly 130 includes a mounting 132, a bracket latch member 134 and a biasing device 136. The bracket latch assembly mounting 132 is coupled, directly coupled, or fixed to the carriage assembly 40. The bracket latch member 134 includes a body 138 with a latch end 140. The bracket latch member body latch end 140 is structured to bracket (as used herein the verb "bracket" means to partially encompass") a portion of the manual override first coupling component 124, i.e. a drive block 94. In an exemplary embodiment, the bracket latch member body latch end 140 is a rectangular cutout 142 sized to correspond to the drive block 94. That is, in an exemplary embodiment, the bracket latch member body 138 is generally planar and is disposed in a plane that is generally aligned with a lead screw 92 axis of rotation. In this configuration, the bracket latch member body latch end 140 extends over the front and back side of the drive block 94. Thus, when the drive block 94 moves, the motion is transferred to the bracket latch member body 138 as well as the carriage assembly 40.

That is, the bracket latch member body 138 is movably coupled to the bracket latch assembly mounting 132. In an exemplary embodiment, the bracket latch member body 138 is structured to translate relative to the bracket latch assembly mounting 132. Further, the bracket latch assembly biasing device 136, which includes, but is not limited to, a compression spring 144 is disposed between the bracket latch member body 138 and the bracket latch assembly mounting 132. In this configuration, the bracket latch member body 138 is structured to move between a first, engaged position, wherein the bracket latch member body 138 engages an associated drive block 94, and a second, disengaged position, wherein the bracket latch member body 138 does not engage an associated drive block 94. Further, the bracket latch assembly biasing device 136 biases the bracket latch member body 138 toward the first position. Further, the bracket latch member body 138, in an exemplary embodiment, includes a finger tab 146 that is structured to assist a user in moving the bracket latch member body 138 between positions.

The drive device control assembly 150 is structured to allow remote control and monitoring of the drive assembly 50, as shown in FIG. 8 (all drive device control assembly elements shown schematically). In an exemplary embodiment, the control assembly 150 includes a control circuit 152, an output assembly 154 and a number of sensors 156.

Further, the control assembly 150 includes a data storage device 158 and an input assembly 160. The control circuit 152 includes hardware and software (shown schematically) such as, but not limited to a programmable logic circuit and memory devices, structured to engage and disengage power to the motor assembly 60, to monitor the sensors 156, discussed below, provide output to the output assembly 154 and to receive and respond to input from the input assembly 160. The control circuit 152 is in electronic communication with the motor assembly 60 and is structured to control, i.e. turn on/off and control the power level to, the motor assembly 60. The control circuit 152 is further structured to control the direction of the motor assembly 60 output.

The control assembly input assembly 160 is structured to receive input from the sensors 156 as well as from a user. The input assembly 160 includes a control panel (not shown) that is remote from the housing assembly 12. The control assembly output assembly 154 is structured to provide information to the user. The control assembly output assembly 154 includes, but is not limited to, a display on the remote control panel. The control assembly output assembly 154 also includes indicators, such as, but not limited to lights, that are illuminated under certain condition, e.g. the carriage assembly 40 located in the second position.

Each sensor 156 is structured to detect a selected characteristic, to generate data representative of that characteristic, and to provide a signal representing that data. Further, each sensor 156 is in electronic communication with the control circuit 152. That is, each sensor 156 signal is communicated to the control circuit 152. For example, the sensors 156 include, but are not limited to, a current sensor 156' and a torque sensor 156". The current sensor 156' is coupled to, and structured to detect the current within, the motor assembly power line 66. The torque sensor 156" is coupled to, and structured to detect the torque within, the motor assembly output shaft 64. In this configuration, the control assembly 150 can detect an increase in the power to, or torque within the motor assembly 60. Such increases may indicate the carriage assembly 40, or other element, has become jammed or stuck.

That is, in an exemplary embodiment, the control assembly data storage device 158 includes data representing an acceptable power draw profile. The control circuit 152 is structured to compare data from the current sensor 156' to the acceptable power draw profile and, if the data from the current sensor 156' deviates from the acceptable power draw profile by a first deviation, the control circuit 152 is structured to present an indication on the output assembly 154. For example, when the current sensor 156' detects an increased current, a warning light (not shown) is illuminated. Further, if the data from the current sensor 156' deviates from the acceptable power draw profile by a second, greater deviation, the control circuit 152 is structured to terminate the operation of the motor assembly 60. Similarly, an indication of increased torque may indicate a jammed carriage assembly 40 and may be processed by the control circuit 152 in a similar manner.

The sensors 156 further include position sensors 156''' and external sensors 156''''. The position sensors 156''' are coupled to at least one of the carriage assembly 40 or the housing assembly 12 and are structured to determine the position of the carriage assembly 40 relative to the housing assembly 12. In an exemplary embodiment, the position sensors 156''' are disposed along the rails 16 and are structured to indicate the position of the carriage assembly 40 relative to the rails 16. This includes, but is not limited to, sensors that indicate when the carriage assembly 40 is in the first and second positions. The control circuit 152 is structured to provide an indication of the carriage assembly 40 position on the output assembly 154. The external sensors 156'''' are structured to measure characteristics of the electrical components such as, but not limited to, current passing through the electrical components.

In an exemplary embodiment, the drive assembly 50 further includes a manual drive assembly 170. The manual drive assembly 170 is structured to impart movement to the positioning assembly 80 manually, i.e. without engaging the motor assembly 60. In an exemplary embodiment, the manual drive assembly 170 includes a mounting 172 and a coupling assembly 174 including a first coupling component 176 and a second coupling component 178. As shown in FIG. 8, and in an exemplary embodiment, the manual drive assembly mounting 172 includes an opening 180 and a bracket 182. The manual drive assembly mounting opening 180 is located in a support assembly vertical sidewall 102 at a location aligned with the axis of rotation of a lead screw 92. That is, the axis of rotation of a lead screw 92 extends generally through the center of the manual drive assembly mounting opening 180. The manual drive assembly mounting bracket 182, in an exemplary embodiment, includes a generally U-shaped body 184 that also defines an opening 186. The manual drive assembly mounting opening 180 and the manual drive assembly mounting bracket opening 186 are both generally circular.

The manual drive assembly first coupling component 176 is, in an exemplary embodiment, a unitary extension of a lead screw 92 having a portion that is a non-circular shape. That is, the lead screw 92 includes an extension 190 sized to extend beyond the associated drive channel 104. The lead screw extension 190 includes a proximal portion 192 and a distal portion 194. The lead screw extension proximal portion 192 is disposed adjacent the lead screw 92, and in an exemplary embodiment, is unitary therewith. The lead screw extension distal portion 194 has a non-circular cross-sectional shape. In an exemplary embodiment, the lead screw 92 extension distal portion 194 has the same diameter as the minor diameter of the lead screw 92 but with opposing sides milled flat. Thus, the manual drive assembly first coupling component 176 is, in an exemplary embodiment, a generally oval shaped portion, i.e. the lead screw extension distal portion 194.

The manual drive assembly second coupling component 178 is structured to be rotatably coupled to the support assembly 90 and fixed to the manual drive assembly first coupling component 176. In an exemplary embodiment, the manual drive assembly second coupling component 178 is a shaped body 200 defining a shaped passage 202. The manual drive assembly second coupling component shaped body 200, in an exemplary embodiment, has an outer shape that is structured to be engaged by a hand tool, such as, but not limited to a wrench. Thus, in an exemplary embodiment, the manual drive assembly second coupling component shaped body 200 has a hexagonal shape similar to a six-sided nut. The manual drive assembly second coupling component shaped passage 202 is sized and shaped to substantially correspond to the lead screw extension 190. That is, the manual drive assembly second coupling component shaped passage 202 includes first portion 204 and a second portion 206. The passage first portion 204 has a substantially circular cross-sectional shape with a diameter substantially corresponding to the diameter of the lead screw extension proximal portion 192. The passage second portion 206 substantially corresponds to the shape of the lead screw extension distal portion 194. That is, in an exemplary embodiment, the passage second portion 206 includes two opposed flat surfaces.

Further, the second coupling component shaped body 200 includes a circumferential channel 210. In an exemplary embodiment, the circumferential channel 210 is disposed about the passage first portion 204. The circumferential channel 210 is sized to correspond to the thickness of the support assembly vertical sidewall 102 that defines the manual drive assembly mounting opening 180.

The manual drive assembly 170 is assembled as follows. The manual drive assembly second coupling component 178 is disposed over the manual drive assembly first coupling component 176. That is, the second coupling component shaped body 200 is coupled to the lead screw extension 190 by passing the lead screw extension 190 through the shaped passage 202. In this configuration, the second coupling component shaped body 200 is fixed to the lead screw extension 190. That is, because the lead screw extension distal portion 194, and because the passage second portion 206 substantially corresponds to the shape of the lead screw extension distal portion 194, the manual drive assembly first and second coupling components 176, 178 cannot rotate relative to each other.

Further, the second coupling component shaped body circumferential channel 210 is disposed at the manual drive assembly mounting opening 180 with the support assembly vertical sidewall 102 extending into the second coupling component shaped body circumferential channel 210. In this configuration, the manual drive assembly second coupling component 178 cannot move axially relative to the lead screw 92, but is still free to rotate relative to the support assembly 90. The manual drive assembly mounting bracket 182 is coupled, directly coupled, or fixed to the support assembly vertical sidewall 102 at a location aligned with the axis of rotation of a lead screw 92. That is, the manual drive assembly mounting bracket opening 186 is generally centered along the axis of the lead screw 92.

In this configuration, a user can couple a tool, such as, but not limited to a wrench, to the manual drive assembly second coupling component shaped body 200 and rotate the manual drive assembly second coupling component 178. The rotational motion applied to the manual drive assembly second coupling component 178 is transferred to the manual drive assembly first coupling component 176 thereby causing the lead screw 92 to rotate. Further, the rotation of the lead screw 92 having the manual drive assembly 170 is transferred to the other lead screw 92 via the transmission assembly 96.

The lock assembly 230 is structured to prevent the rotation of a lead screw 92. In an exemplary embodiment, the lock assembly 230 includes a movable bolt (not shown) that is actuated by a key (not shown). The bolt is structured to move between a withdrawn, first position, wherein the bolt does not engage the lead screw 92, and an extended, second position, wherein the bolt engages the lead screw. When the bolt engages the lead screw 92, rotation of the lead screw 92 is prevented.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A drive assembly for an electrical apparatus racking assembly, said racking assembly including a carriage assembly structured to be movably disposed in an electrical apparatus housing assembly, said carriage assembly structured to be moved between a first position and a second position, said housing assembly including a number of sidewalls defining a substantially enclosed space, wherein said motor assembly includes an electric motor including a power line and a rotating output shaft, said drive assembly comprising:
   a positioning assembly, said positioning assembly structured to impart movement to said carriage assembly and to move said carriage assembly from said first position to said second position;
   a motor assembly, said motor assembly structured to impart movement to said positioning assembly;
   a control assembly, said control assembly structured to control said motor assembly;
   said control assembly in electronic communication with said motor assembly;
   said motor assembly operatively coupled to said positioning assembly;
   said control assembly includes a control circuit, an output assembly and a number of sensors;
   said control circuit in electronic communication with said output assembly, said number of sensors, and said motor assembly;
   said control circuit structured to control said motor assembly;
   said number of sensors include a current sensor and a torque sensor;
   said current sensor structured to detect a current and to provide an output signal relating to said detected current;
   said current sensor coupled to, and structured to detect the current in, said electric motor power line;
   said torque sensor structured to detect the torque in a rotating shaft and to provide an output signal relating to said detected torque; and
   said torque sensor coupled to, and structured to detect the torque in, said electric motor output shaft.

2. The drive assembly of claim 1 wherein:
   said positioning assembly includes a number of lead screws, a number of drive blocks, and a transmission assembly;
   each said drive block movably coupled to an associated lead screw;
   said transmission assembly operatively coupled to said motor assembly and to each said lead screw; and
   wherein, actuation of said motor assembly generates a motion, said motor assembly motion transferred to said transmission assembly causing a transmission assembly motion, and, said transmission assembly motion is transferred to each said lead screw.

3. The drive assembly of claim 2 wherein said transmission assembly includes a tension member, said tension member operatively coupled to said motor assembly and to each said lead screw.

4. The drive assembly of claim 3 wherein said tension member is one of a belt, toothed belt or a chain.

5. The drive assembly of claim 2 wherein:
   said positioning assembly includes a support assembly;
   said support assembly including a generally planar member and a number of generally vertical sidewalls;
   said support assembly generally defining the height of the drive assembly; and wherein said support assembly has a height of between about 1.5 inches and 3.5 inches.

6. The drive assembly of claim 1 wherein:
said control circuit includes a data storage device;
said data storage device includes data representing an acceptable power draw profile;
wherein said control circuit is structured to compare data from said current sensor to said acceptable power draw profile; and
wherein, if said data from said current sensor deviates from said acceptable power draw profile by a first deviation, said control circuit is structured to present an indication on said output assembly.

7. The drive assembly of claim 6 wherein, if said data from said current sensor deviates from said acceptable power draw profile by a second deviation, said control circuit is structured to terminate the operation of said motor assembly.

8. The drive assembly of claim 1 wherein:
said number of sensors include a number of position sensors;
said number of position sensors coupled to at least one of said carriage assembly or said housing assembly; and
said number of position sensors structured to determine the position of said carriage assembly relative to said housing assembly.

9. The drive assembly of claim 1 wherein:
said control assembly includes an input assembly; and
said input assembly is structured to receive input from a remote location.

10. A drive assembly for an electrical apparatus racking assembly, said racking assembly including a carriage assembly structured to be movably disposed in an electrical apparatus housing assembly, said carriage assembly structured to be moved between a first position and a second position, said housing assembly including a number of sidewalls defining a substantially enclosed space, said drive assembly comprising:
a positioning assembly, said positioning assembly structured to impart movement to said carriage assembly and to move said carriage assembly from said first position to said second position;
a motor assembly, said motor assembly structured to impart movement to said positioning assembly;
a control assembly, said control assembly structured to control said motor assembly;
said control assembly in electronic communication with said motor assembly;
said motor assembly operatively coupled to said positioning assembly;
said positioning assembly includes a number of lead screws, a number of drive blocks, and a transmission assembly;
each said drive block movably coupled to an associated lead screw;
said transmission assembly operatively coupled to said motor assembly and to each said lead screw;
wherein, actuation of said motor assembly generates a motion, said motor assembly motion transferred to said transmission assembly causing a transmission assembly motion, and, said transmission assembly motion is transferred to each said lead screw;
said positioning assembly includes a manual override device; and
said manual override device structured to selectively decouple said positioning assembly and said carriage assembly and to allow manual movement of said carriage assembly.

11. The drive assembly of claim 10 wherein:
said manual override includes a selectively couplable coupling assembly;
said manual override coupling assembly including a number of first coupling components and a number of second coupling components;
each said manual override first coupling component coupled to each said lead screw; and
each said manual override second coupling component coupled to said carriage assembly.

12. The drive assembly of claim 11 wherein:
each said manual override first coupling component is a drive block; and
each said manual override second coupling component is a bracket latch assembly;
each said bracket latch assembly including a bracket latch member and a biasing device;
each said bracket latch member structured to move between a first position, wherein each said bracket latch member engages an associated drive block, and a second position, wherein each said bracket latch member does not engage an associated drive block; and
each said bracket latch assembly biasing device coupled to a bracket latch member and structured to bias said bracket latch member to said bracket latch member first position.

13. A drive assembly for an electrical apparatus racking assembly, said racking assembly including a carriage assembly structured to be movably disposed in an electrical apparatus housing assembly, said carriage assembly structured to be moved between a first position and a second position, said housing assembly including a number of sidewalls defining a substantially enclosed space, said drive assembly comprising:
a positioning assembly, said positioning assembly structured to impart movement to said carriage assembly and to move said carriage assembly from said first position to said second position;
a motor assembly, said motor assembly structured to impart movement to said positioning assembly;
said positioning assembly includes a number of lead screws, a number of drive blocks, and a transmission assembly;
each said drive block movably coupled to an associated lead screw;
said transmission assembly operatively coupled to said motor assembly and to each said lead screw;
a manual drive assembly structured to impart movement to said positioning assembly;
said manual drive assembly includes a first coupling component and a second coupling component;
wherein said manual drive assembly first coupling component is unitary with one of said number of lead screws;
said manual drive assembly second coupling component including a shaped body; and
said manual drive assembly second coupling component fixed to said manual drive assembly first coupling component.

14. The drive assembly of claim 13 wherein:
said manual drive assembly first coupling component includes an extension of said lead screw with a non-circular portion; and said manual drive assembly second coupling component shaped body includes a passage with a portion shaped to correspond to said lead screw extension non-circular portion.

15. The drive assembly of claim 13 wherein:
said positioning assembly includes a support assembly;
said support assembly including a generally planar member and a number of generally vertical sidewalls;
one said vertical sidewall defining a generally circular opening, said opening aligned with a lead screw;
said manual drive assembly second coupling component shaped body including a circumferential channel; and
said manual drive assembly second coupling component shaped body rotatably coupled to said support assembly with said manual drive assembly second coupling component shaped body disposed in said generally circular opening.

* * * * *